(12) United States Patent
Ghiazza (10) Patent No.: US 6,397,053 B1
(45) Date of Patent: May 28, 2002

(54) REDUCTION OF POWER CONSUMPTION WITH INCREASED STANDBY TIME IN WIRELESS COMMUNICATIONS DEVICE

(75) Inventor: Jean-Yves Ghiazza, Nice (FR)

(73) Assignee: Koninklijke Philips Electronics N.V. (KPENV), Eindhowen (NL)

( * ) Notice: Subject to any disclaimer, the term of this patent is extended or adjusted under 35 U.S.C. 154(b) by 0 days.

(21) Appl. No.: 09/475,889

(22) Filed: Dec. 30, 1999

(51) Int. Cl.$^7$ .................................................. H04B 1/16
(52) U.S. Cl. .......................... 455/343; 455/522; 455/574
(58) Field of Search ................................. 455/343, 572, 455/573, 574, 334, 522

(56) References Cited

U.S. PATENT DOCUMENTS

| | | | | |
|---|---|---|---|---|
| 4,580,291 A | * | 4/1986 | Ab Der Halden | 455/606 |
| 4,841,440 A | * | 6/1989 | Yonezu et al. | 364/200 |
| 4,964,121 A | * | 10/1990 | Moore | 370/100.1 |
| 5,745,375 A | | 4/1998 | Reinhardt et al. | 364/492 |
| 5,995,820 A | | 11/1999 | Young et al. | 455/343 |

FOREIGN PATENT DOCUMENTS

| | | |
|---|---|---|
| EP | 632360 | 1/1995 |
| EP | 726688 | 8/1996 |
| WO | 99/22536 | 5/1999 |

\* cited by examiner

Primary Examiner—Daniel Hunter
Assistant Examiner—Thuan T. Nguyen

(57) ABSTRACT

A method and apparatus for reducing power consumption of a receiver of a communications device that does not change the global hardware of the device and uses the current master clock to lower the clock frequency. In an example embodiment, a method directed to reducing power consumption of a receiver of a communications device during an idle state. The receiver has an internal power source and a corresponding base unit. The method includes generating a clock signal that has an output frequency that varies, the frequency being higher in an active state and lower in an inactive state, such that the receiver consumes more power during the active state then when in the inactive state. Power consumption by the receiver is reduced by dynamically and synchronously switching the clock frequency to a lower clock frequency. Receiver power consumption is a function of the power consumed during the active and inactive states and the duration of the idle state.

20 Claims, 8 Drawing Sheets

REDUCTION OF POWER CONSUMPTION WITH INCREASED STANDBY TIME IN WIRELESS COMMUNICATIONS DEVICE

FIELD OF THE INVENTION

This invention generally relates to a power conserving arrangement for, and method of, minimizing battery power consumption during stand-by operation of a portable, battery-operated, mobile device and, more particularly, a wireless telephone system.

BACKGROUND OF THE INVENTION

A typical cellular telephone communicates with a base station, the base station transmitting messages to the cellular telephone on a regular basis. Similarly, a cordless telephone communicates with the base unit and remains ready to respond to any incoming call. These telephones usually include some form of a transceiver and a decoder under microprocessor control.

During a standby mode of operation, the telephone waits to receive a telephone call through the base unit. During the stand-by mode of operation, the telephone continuously receives and decodes all messages transmitted by the base unit and synchronizes itself with the base unit regularly. The telephone consumes electrical power in both the talk and the standby modes. In cordless battery-operated telephones, the on-board battery typically has a working lifetime of approximately 100 hours in the stand-by mode and about 10 hours in the talk mode (in the DECT standard as an example). The battery is then re-charged or replaced to continue telephone service. The microprocessor and other electronic components onboard the telephone are energized during the standby mode which contributes to current drain on the battery. The need to increase the battery lifetime between re-charges and/or battery replacement is self-evident.

Cordless telephones, while in an idle or standby mode, constantly monitor a continuous stream of signals sent by the base unit. Typically, the cordless telephone uses a dotting sequence, the first segment of the message to synchronize the telephone hardware to a master clock frequency in the base. The portable unit or handset (cordless or cellular) needs to be synchronized with the base station and transmitted signal to allow for accurate and reliable communication.

In order to preserve power of the battery in the handset, the receiver portion or the handset moves into an idle locked mode or standby mode waiting for an actual call to come in. The handset typically powers down during the standby mode but the internal communication circuits need to remain in synchronization with the base station signal, thereby consuming battery power. It would be commercially advantageous to provide a method and an apparatus for reducing power consumption during the standby mode without increasing cost or hardware complexity.

SUMMARY OF THE INVENTION

The present invention is exemplified in a number of implementations and applications, some of which are summarized below. One of the advantages of the present invention is the ease of incorporation of the method into existing wireless telephones without significant hardware or software redesign. Accordingly, a method is described herein that addresses this need of reducing power consumed by a receiver of a communications device. In an example embodiment, the receiver has an internal power source and a corresponding base unit. The receiver of the communications device is adapted to receive a transmitted signal in the form of a data stream, the data stream defined by a plurality of frames, each of the frames including a synchronization sub-frame. The method includes detecting the activity status of the receiver with respect to the transmitted signal, the receiver being in an idle state when not receiving a transmitted signal. The idle state is defined by a predetermined number of frames that include a set of active state frames and inactive state frames that combine to defined a duration of the idle state. A clock signal is generated that has an output frequency that varies as a function of the active and inactive frames. The clock frequency is higher in the active state and lower in the inactive state, such that the receiver consumes more power during the active state then when in the inactive state. The receiver is then synchronized with the sub-frame of the transmitted signal during the idle state. Power consumed by the receiver is then reduced by reducing the clock frequency as the number of inactive frames within the idle state are increased. In the present invention, the power consumed by the receiver is a function of the power consumed during the active and inactive states and the duration of the idle state.

According to another aspect of the invention, a method is directed to reducing power consumption of a receiver of a communications device during an idle state mode. The receiver has an internal power source and a corresponding base unit. The receiver of the communications device is adapted to receive a transmitted signal in the form of a data stream defined by a plurality of frames. The idle state is defined by a predetermined number of frames that include a set of active state frames and inactive state frames that combined to define a duration of the idle state. The method includes generating a clock signal that has an output frequency that varies as a function of the active and inactive frames. The clock frequency is higher in the active state and lower in the inactive state, such that the receiver consumes more power during the active state then when in the inactive state. The receiver is then synchronized with the sub-frame of the transmitted signal during the idle state. The power consumed by the receiver is then reduced by dynamically and synchronously switching the clock frequency to a lower clock frequency. The lower clock frequency corresponds to the inactive state and the increased number of inactive frames within the idle state. The power consumed by the receiver is a function of the power consumed during the active and inactive states and the duration of the idle state.

In yet another aspect of the invention, a system for reducing power consumption of a receiver of a communications device is described. The receiver has an internal power source and a corresponding base unit. The receiver is adapted to receive a transmitted signal in the form of a data stream, the data stream defined by a plurality of frames, each of the frames including a synchronization sub-frame. The system includes a detector adapted to detect the activity status of the receiver with respect to the transmitted signal. The receiver is in an idle state when not receiving a transmitted signal, the idle state defined by a predetermined number of frames that include a set of active state frames and inactive state frames that combined define a duration of the idle state. A clock signal generator coupled to the detector generates a clock signal with an output frequency that varies as a function of the active and inactive frames. The clock frequency is higher in the active state and lower in the inactive state, such that the receiver consumes more power during the active state then when in the inactive state. Synchronizing circuitry, coupled to the receiver and the clock signal generator, synchronizes the receiver with the sub-frame of the transmitted signal during the idle state and reduces the power consumed by the receiver. The power consumed by the receiver is reduced by reducing the clock frequency by increasing the number of inactive frames within the idle state. The power consumed by the receiver is a function of the power consumed during the active and inactive states and the duration of the idle state.

In yet another aspect of the invention, an apparatus is directed to reducing power consumption of a receiver of a communications device during an idle state. The receiver has an internal power source and a corresponding base unit. The receiver is adapted to receive a transmitted signal in the form of a data stream defined by a plurality of frames. The idle state is defined by a predetermined number of frames that include a set of active state frames and inactive state frames that combine to define a duration of the idle state. The apparatus includes a clock signal generator that has an output frequency that varies as a function of the active and inactive frames. The clock frequency is higher in the active state and lower in the inactive state, such that the receiver consumes more power during the active state then when in the inactive state. The apparatus further includes circuitry for synchronizing the receiver with the transmitted signal during the idle state, the circuitry coupled to the receiver and the clock signal generator. The apparatus also includes a mechanism adapted to reduce the power consumed by the receiver that is coupled to the clock generator. The mechanism dynamically and synchronously switches the clock frequency to a lower clock frequency corresponding to the inactive state that has an increased number of inactive frames within the idle state. The power consumed by the receiver is a function of the power consumed during the active and inactive states and the duration of the idle state.

The above summary is not intended to provide an overview of all aspects of the present invention. Other aspects of the present invention are exemplified and described in connection with the detailed description.

BRIEF DESCRIPTION OF THE DRAWINGS

Various aspects of, discoveries made in connection with, and advantages of, the present invention will become apparent upon reading the following detailed description of various example embodiments and upon reference to the drawings in which:

FIG. 7 is a schematic of the global logic implementing the example embodiment described in FIG. 6, made in accordance with an example embodiment of the present invention.

While the invention is amenable to various modifications and alternative forms, specifics thereof have been shown by way of example in the drawings and will be described in detail. It should be understood, however, that the intention is not to limit the invention to any particular embodiment described. On the contrary, the invention is to cover all modifications, equivalents, and alternatives falling within the spirit and scope of the invention as defined by the appended claims.

DETAILED DESCRIPTION

The present invention may be applied to a variety of wireless communication systems and devices, the power reduction method and system has been found to be advantageous for use in connection with cordless telephones and portable wireless devices needing to conserve battery power. While the present invention is not necessarily so limited, an appreciation of various aspects of the invention may be obtained through a discussion of various application examples.

In one example application of the present invention, a method for reducing power consumption of a receiver of a communications device during an idle state mode is described. The receiver has an internal power source and a corresponding base unit. The receiver of the communications device is adapted to receive a transmitted signal in the form of a data stream defined by a plurality of frames. The idle state mode has a predetermined number of frames that include a set of active state frames and inactive state frames that combined to define a duration of the idle state. The method includes generating a clock signal that has an output frequency that varies as a function of the active and inactive frames. The clock frequency is higher in the active state and lower in the inactive state, such that the receiver consumes more power during the active state then when in the inactive state. The receiver is then synchronized with the transmitted signal during the idle state. Overall power consumption by the receiver is then reduced by dynamically and synchronously switching the clock frequency to a lower clock frequency. The lower clock frequency corresponds to the inactive state and the increased number of inactive frames within the idle state. Overall power consumption is a function of the power consumed during the active and inactive states and the duration of the idle state.

In another example application, a cordless telephone would have circuitry incorporated in the handset that would be synchronized with the base unit for reducing power consumption by the handset when no communications is actively occurring. The clock frequency within the handset can be reduced without the use of a second crystal oscillator that would clock at a lower frequency to conserve power. The current master clock frequency can be switched dynamically and synchronously to a lower frequency by dividing the clock signal by a predetermined divisor, via divisor circuitry. The handset is readied for resynchronization with the base unit by an internal timing signal to avoid prolonged periods of inactivity leading to the handset loosing synchronization due to "too much sleep".

Figure 1:
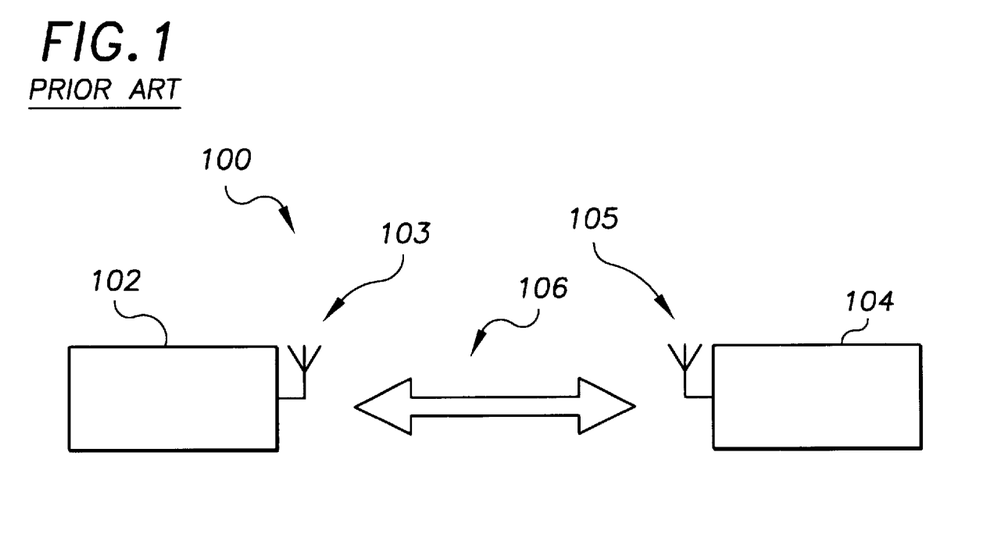
FIG. 1 is a schematic of an example prior art communication system between a base station or unit and a handset or receiver.

Referring now to FIG. 1, a schematic 100 of an example prior art wireless communications system between a base station or unit and a handset or receiver is illustrated. The communications system 100 includes a fixed part 102, with an antenna 103 for transmitting a signal 106, and a portable part 104, with an antenna 105 for receiving the transmitted signal 106. Although not shown, in many applications both parts have receiving and transmitting arrangements. The fixed part can be, for example, a base station transmitter for cellular communications or a base unit for wireless communication at home. The portable part can be a cellular telephone or a portable handset for residential use. This example can also represent wireless communication with wireless portable devices such as PDAs (personal digital assistants) or paging devices or PCs with wireless modems. With respect to the present invention, system 100 represents a cordless telephone system, but the teachings of the present invention are not limited to this example embodiment. As shown, the communications standard that applies in the system can be either the European DECT standard or the North American PWT for transmitting and receiving signals in the form of frames composed of bits.

In normal operation, portable part or receiver 104 is synchronized with the signals that are being transmitted regularly from fixed part or base unit 102. Receiver 104 enters into a standby or idle locked mode when regular communications are not detected in order to conserve battery power. However, at all times receiver 104 remains in synchronization with base unit 102 to ensure accurate and reliable communications. Between synchronization cycles, receiver 104 activity is very low and it does not require the same clock frequency than when in an active mode. During this power down or standby period some systems go into a sleep mode to conserve energy, but there is a concern that receiver 104 will lose synchronization with base 102 unless some internal mechanism exists to regularly clock signals through without using too much power. It is possible to include a second crystal oscillator for the purpose of providing a lower clock frequency however this additional hardware will increase the cost and complexity of the receiver unit. The instant invention proposes a method of reducing the power consumed through the base band chip during the idle locked mode. The master clock of the baseband chip is dynamically and synchronously switched to a lower clock frequency such that less power is consumed. The present invention is easily retrofitable to current receivers without substantially altering the hardware and cost of the receiver.

Figure 2:
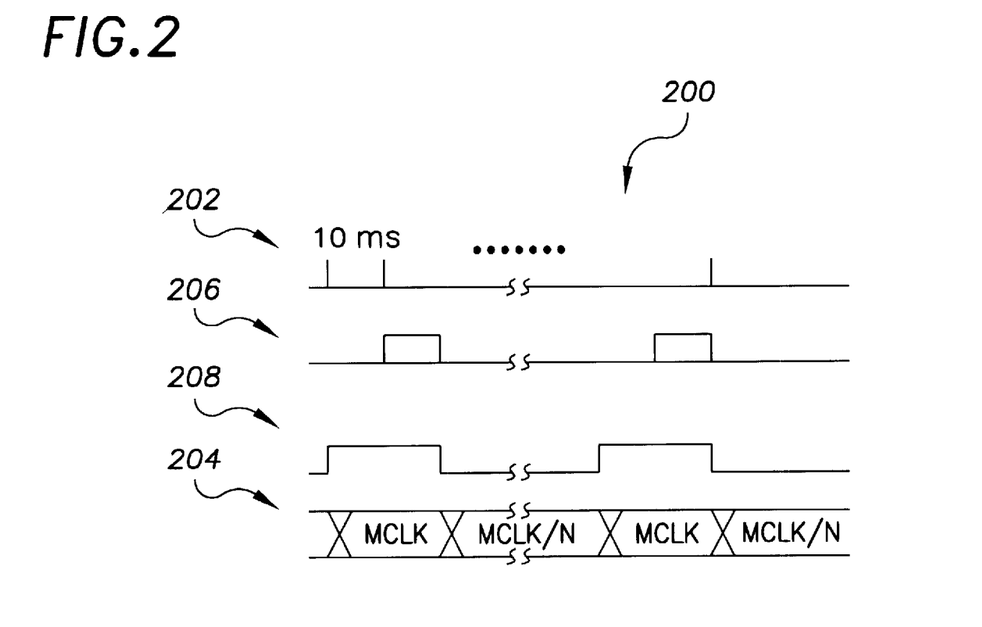
FIG. 2 is a timing diagram of the master clock during the idle or suspend mode, resulting from an example embodiment of the present invention.

Referring to FIG. 2, an example timing diagram 200 of a communications system is shown with a signal 202 that represents the DECT reference timing from base unit 102. The symbol SYNCH represents the signal that is sent every frame to receiver 104 in the DECT format to ensure that the clock timing of the receiver is aligned with the master clock reference timing of the base unit. When no communication is ongoing between the receiver and the base unit, the receiver is synchronized on every "X" DECT frame on the base unit 102 but not on every frame. Note the "X" frame in the master clock signal 204 as well. This is the time that the receiver activity 206 is starting into a suspend mode, shown by Suspend Mode signal 208, and the clock frequency does not need to remain in the higher frequency of the active mode. Each frame is 10 milliseconds in duration and the type of duty cycle dictates the number of DECT frames that the receiver circuitry tracks. During the Normal Duty Cycle (normal power consumption) "X" is equivalent to 16 DECT frames or 1 MultiFrame (or 160 ms). During the Low Duty Cycle, "X" is equivalent to 64 DECT frames or 4 MultiFrames (or 640 ms). Therefore, synchronization will occur more frequently when the receiver is in the Normal Duty versus the Low Duty Cycle. When the suspend mode signal 208 goes low, it is reflected by a changed master clock frequency of MCLK/N; N being a whole number divisor that decreases the master clock frequency.

Figure 3:
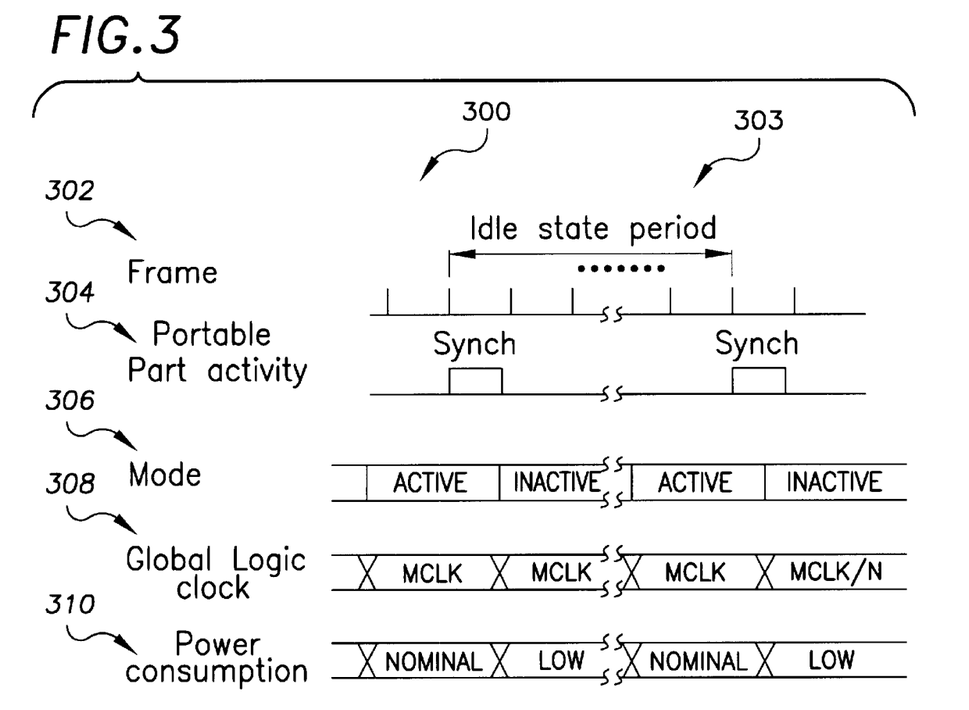
FIG. 3 is a timing diagram illustrating levels of power consumption during active and inactive states of the suspend mode, resulting from an example embodiment of the present invention.

Referring now to FIG. 3, a timing diagram 300 resulting from an example embodiment of the present invention illustrates levels of power consumption during the idle locked mode. Specifically, base signal frames 302 define an idle state period 303 composed of a predetermined number of frames in a suspend mode 306. At the start of the idle state period the receiver 304 is synchronized with base signal 302 and is again synchronized at the start of the next MultiFrame cycle (1 or 4, depending on the type of duty cycle). Suspend mode 306 includes active state frames and inactive state frames of the suspend mode that correspond to the master clock signal 308 and to power consumption levels 310. The active state and nominal power consumption correspond to the normal master clock frequency MCLK. The inactive state and low power consumption correspond to the master clock frequency MCLK/N, a master clock frequency that has been lowered by a divisor of N.

Figure 4:
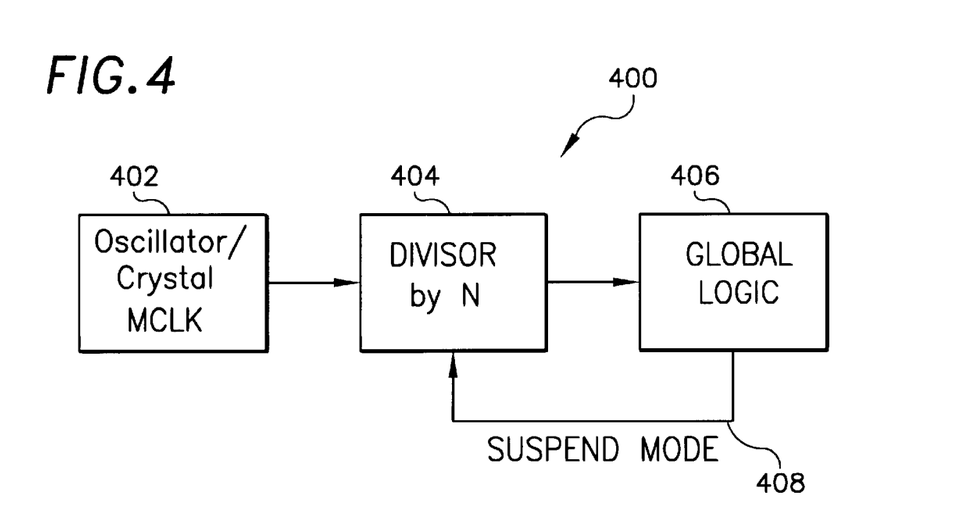
FIG. 4 is a schematic of the master clock signal generator coupled to the global logic of the receiver, representing an example embodiment of the present invention.
Figure 5:
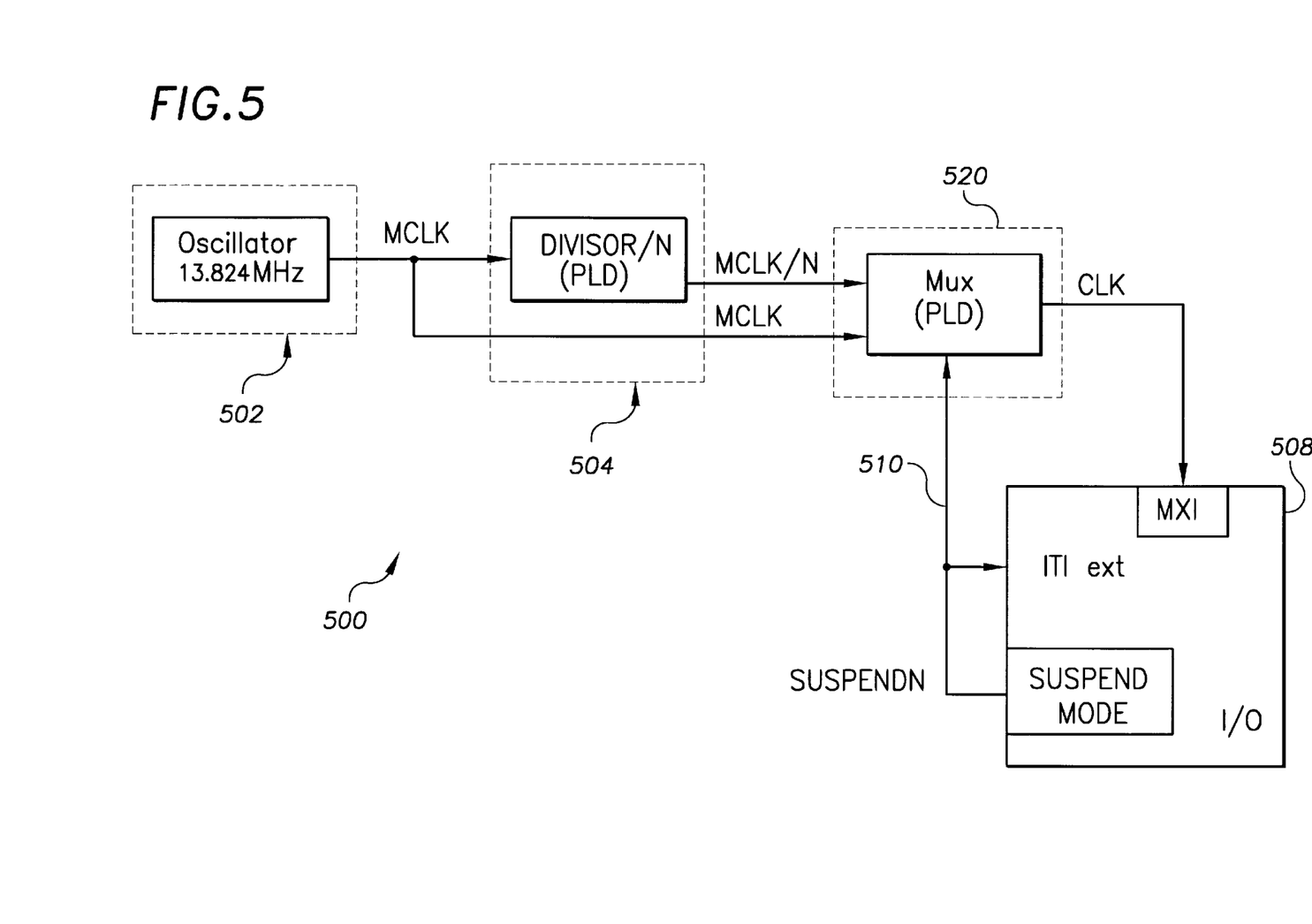
FIG. 5 is a global schematic of the master clock signal generator coupled to other components of the receiver, representing an example embodiment of the present invention.

Referring to FIGS. 4 and 5, the schematics of the master clock signal generator coupled to the global logic of the receiver 400 and to the expanded global logic 500 illustrate an example embodiment of the present invention. In particular, master clock generator 402, that includes an oscillator circuit or a crystal oscillator, has its signal feed through a divisor 404 where it is divided by N before going into the global logic 406 of the receiver. When the baseband chip is in suspend mode or the inactive state 408, N is a whole number greater than one and divisor 404 acts to lower the master clock frequency. When the chip is in the active state and needs to resynchronize with the base unit, N equals one and the master clock frequency basically remains the same.

In FIG. 5, schematic 500 of the master clock signal generator illustrates an oscillator circuit 502 generating a 13.824 MHz signal that is clocked through a divisor 504 that has its output multiplexed through MUX 506 and into the remaining receiver logic 508. A suspend signal 510 is fed back through MUX 506 to initiate the dividing function of the master clock frequency when the suspend mode is triggered.

Figure 6:
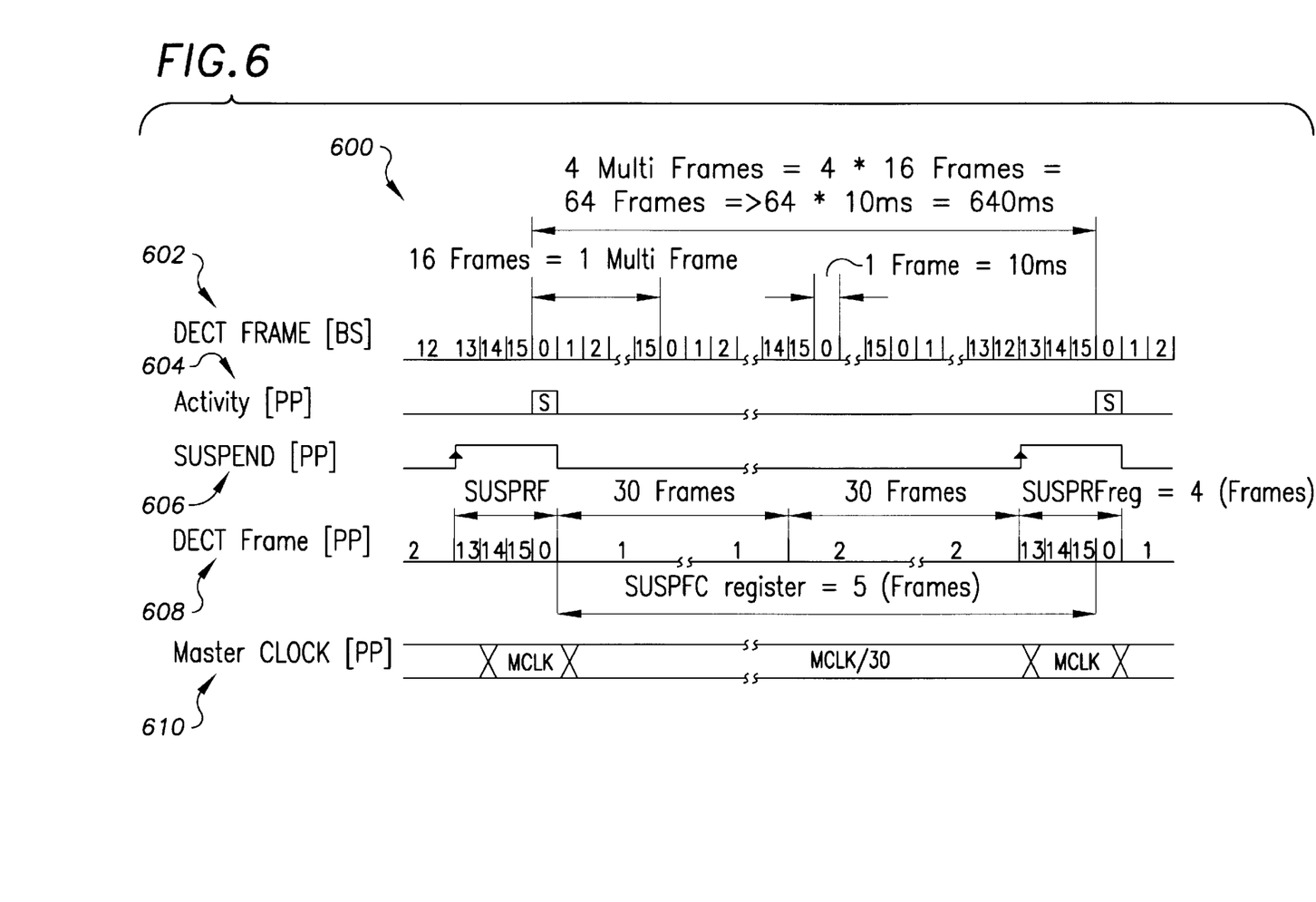
FIG. 6 is a timing diagram illustrating an example of the suspend signal switching off the power to the receiver, made in accordance with an example embodiment of the present invention.

Referring now to FIG. 6, a timing diagram 600 illustrates an example of the suspend signal switching off the power to the receiver, made in accordance with an example embodiment of the present invention. In this example, the base unit generates a signal 602 that has a normal master clock frequency and generates a standard timing sequence. The frame boundaries are regular and are the reference points in the system. Parameters controlled in the system include:

| | |
|---|---|
| TXFRAME register | = DECT Frame counter |
| MFH MFM MFL register | = DECT Multi Frame counter |
| SUSPFC register | = Number of DECT frames in SUSPEND mode |

| | -continued |
|---|---|
| SUSPRFCNTL register | = Number of DECT Frames where SUSPEND (N) signal is HIGH during the active frames. (Minimum value = 2; Register = x00 & x01 give also 2 frames). This register does not influence the number of suspend frames. |

The suspend signal is initially designed to switch OFF the external radio module within the receiver during the suspend mode to decrease power consumption. The external radio module converts the RF signal to digital form within the receiver before being processed. When the receiver is switched ON again, the receiver needs a certain amount of time to power up and resynchronize with the base unit signal. The suspend signal approach can adjust the time period after the receiver is switched ON.

In FIG. 6, the Frame and MultiFrame counters within the base unit and the receiver are incremented automatically by the hardware of the base unit 102 and by a combination of hardware and software in receiver 104. The activity of the receiver is represented by signal 604 that synchronizes with the base once every 64 frames. The moment that the suspend signal goes high (or ends) triggers an interrupt to the microprocessor to drive an update of the Frame and Multi-Frame counters within receiver 104. This occurs in the DECT timing format since the Frame and MultiFrame counters may be out of sync with the corresponding counters of the base unit. The time that suspend signal 606 is HIGH is adjustable and the signal is high when the chip is active and needs to recover the synchronization. The suspend signal is LOW when the chip is in SUSPEND mode and the master clock 610 reflects a lower signal; the lower signal having been divided by 30 in this example. DECT Frame 608 for the receiver has a number of frames defined for the suspend mode parameter SUSPFC, which is about 30 frame increments when the divisor is 30. At the sixtieth frame, suspend 606 transitions from LOW to HIGH again for four frames as the receiver is prepared for resynchronization. The master clock frequency also increases at this point to its normal rate. This LOW to HIGH transition activates the external Interrupt (ITI) to update the Frame and MultiFrame counters (through the software). The update occurs on the front edge of the SUSPEND signal when the chip goes out of the suspend mode, to ensure that the receiver is in line with the base unit in terms of the Frame and MultiFrame numbers. Due to the fact that the master clock frequency is reduced by the divisor, the receiver Frame and MultiFrame counters may not have the same value as the base unit counter.

Working through the specific example as simply an illustration, the parameter values depend on MCLK division as shown in the table below (based on Low duty cycle mode):

TABLE 6-1

| | Parameters | | | |
|---|---|---|---|---|
| MCLK/N | SUSPFC | SUSPRFCNTL | TXFRAME | Multi Frame counter |
| CLK = MCLK | 63 | 2 | No adjustment | No adjustment |
| CLK = MCLK/30 | 5 | 4 | 13 | +3 |

TABLE 6-1-continued

In order to calculate SUSPFC, the following formulas are used:

NbFSM=(SUSPFC−SUSPadd)*N+SUSPadd

SUSPFC=SUSPadd+(NbFSM−SUSPadd)/N

Where:
NbFSM=Number of Frame in suspend mode
In the LOW Duty cycle mode=>NbFSM=63.
In Normal Duty cycle mode=>NbFSM=15.
SUSPadd=SUSPRFCNTL−1
Because of SUSPRFCNTL, it is possible to find an integer in the formula.
SUSPadd=4−1=3
SUSPFC=3+(63−3)/15=7
TXFRAME value depends on SUSPRFCNTL and can be easily found since the synchronization always occurs on Slot 0.

The Multi Frame Counter correction (MFCC) can be calculated as follows:

MFCC=3−SUSPFC/16; where MFCC is an integer.

This formula is effective as long as SUSPRFCNTL<16.
The following illustrates the resulting power consumption during normal master clock signaling conditions:

| CLK = MCLK | After Reset | LOCK + SUSPEND |
|---|---|---|
| Power (mW) | 6.48 | 8.43 |

When the divisor is incorporated into the circuit, the following occurs:

| CLK = MCLK/30 | After Reset | LOCK + SUSPEND |
|---|---|---|
| Power (mW) | 6.56 | 0.35 |

Note that in this example a power consumption reduction of about 20 times was achieved using an embodiment of the present invention. One of the advantages to this approach is that the logic required to implement this method does not overly complicate an existing hardware design and can partly be achieved through software modifications.

Referring to FIG. 7, an example circuit arrangement 700 illustrates one form of the embodiment of FIG. 6. Master clock 702 serves as an input signal to the first of two inputs of a multiplexer ("MUX") 714 and clocks counter 704 and flip-flop 708. The data output of counter 704 feeds the clock input of a second counter 705 which, in turn, drives (through an inverter 712) the other of the two inputs of the MUX 714. A suspend mode signal 706 feeds inputs to a flip-flop 708 and to a NOR gate 710. The carry output of counter 704 is combined with the signal 706 at NOR gate 710 for loading the counter 704. The MUX 714 is data-selected by the output of flip-flop 708 to provide the clock output at 715, which feeds the global logic of the receiver to reflect the changeable clock frequency depending on the divisor.

The various embodiments described above are provided by way of illustration only and are not intended to limit the invention. Those skilled in the art will readily recognize various modifications and changes that may be made to the present invention without strictly following the example embodiments and applications illustrated and described herein. The scope of the present invention is set forth in the following claims.

I claim:

1. A method of reducing power consumption of a receiver of a communications device, the receiver having an internal power source and a corresponding base unit, the receiver adapted to receive a transmitted signal in the form of a data stream, the data stream defined by a plurality of frames, each of the frames including a synchronization sub-frame, the method comprising the steps of:

detecting the activity status of the receiver with respect to the transmitted signal, the receiver being in an idle state when not receiving a transmitted signal, the idle state defined by a predetermined number of frames that include a set of active state frames and inactive state frames that combine to define a duration of the idle state;

generating a clock signal that has an output frequency that varies as a function of the active and inactive frames, the clock frequency being higher in the active state and lower in the inactive state, such that the receiver consumes more power during the active state then when in the inactive state;

synchronizing the receiver with the sub-frame of the transmitted signal during the idle state; and reducing power consumption of the receiver by reducing the clock frequency as the number of inactive frames within the idle state are increased, power consumption being a function of the power consumed during the active and inactive states and the duration of the idle state.

2. The method of claim 1, wherein the step of reducing power consumption includes decreasing the number of active frames.

3. The method of claim 1, wherein the idle period length remains unchanged irrespective of the clock frequency output.

4. The method of claim 1, wherein the frames of the idle state have a frame boundary with a programmable length.

5. The method of claim 4, wherein the active and inactive frames start and stop on the frame boundary.

6. The method of claim 1, wherein the clock frequency is decreased during the inactive state by a factor of N, where N is a number greater than 1.

7. The method of claim 1, further including the step of synchronizing a frame counter of the receiver with a frame counter of the base unit at the end of the inactive state.

8. The method of claim 7, further including the step of synchronizing a multiframe counter of the receiver with a multiframe counter of the base unit at the end of the inactive state.

9. A method for reducing power consumption of a receiver of a communications device during an idle state, the receiver having an internal power source and a corresponding base unit, the receiver adapted to receive a transmitted signal in the form of a data stream defined by a plurality of frames, the idle state defined by a predetermined number of frames that include a set of active state frames and inactive state frames that combine to define a duration of the idle state, the method comprising the steps of:

generating a clock signal that has an output frequency that varies as a function of the active and inactive frames, the clock frequency being higher in the active state and lower in the inactive state, such that the receiver consumes more power during the active state then when in the inactive state;

synchronizing the receiver with the sub-frame of the transmitted signal during the idle state; and reducing power consumption of the receiver by dynamically and synchronously switching to a low clock frequency corresponding to the inactive state as the number of inactive frames within the idle state are increased, power consumption being a function of the power consumed during the active and inactive states and the duration of the idle state.

10. The method of claim 9, wherein the step of reducing overall power consumption includes decreasing power consumption by decreasing the number of active frames.

11. The method of claim 9, wherein the idle state duration remains unchanged irrespective of the clock frequency output.

12. The method of claim 9, wherein the frames of the idle state have a frame boundary with a programmable length.

13. The method of claim 12, wherein the active and inactive frames start and stop on the frame boundary.

14. The method of claim 7, wherein the clock frequency is decreased during the inactive state by a factor of N, where N is an integer greater than 1.

15. The method of claim 9, further including the step of synchronizing a frame counter of the receiver with a frame counter of the base unit at the end of the inactive state.

16. The method of claim 15, further including the step of synchronizing a multiframe counter of the receiver with a multiframe counter of the base unit at the end of the inactive state.

17. A system for reducing power consumption of a receiver of a communications device, the receiver having an internal power source and a corresponding base unit, the receiver adapted to receive a transmitted signal in the form of a data stream, the data stream defined by a plurality of frames, each of the frames including a synchronization sub-frame, the method comprising the steps of:

detector means for detecting the activity status of the receiver with respect to the transmitted signal, the receiver being in an idle state when not receiving a transmitted signal, the idle state defined by a predetermined number of frames that include a set of active state frames and inactive state frames that combine to define a duration of the idle state;

a clock signal generator for generating a clock signal with an output frequency that varies as a function of the active and inactive frames, the clock frequency being higher in the active state and lower in the inactive state, such that the receiver consumes more power during the active state then when in the inactive state;

synchronizing circuitry, coupled to the receiver and the clock signal generator, for synchronizing the receiver with the sub-frame of the transmitted signal during the idle state and for reducing overall power consumption of the receiver, reducing power consumption by reducing the clock frequency as the number of inactive frames within the idle state are increased, power consumption being a function of the power consumed during the active and inactive states and the duration of the idle state.

18. An apparatus for reducing power consumption of a receiver of a communications device during an idle state, the receiver having an internal power source and a corresponding base unit, the receiver adapted to receive a transmitted signal in the form of a data stream defined by a plurality of frames, the idle state defined by a predetermined number of frames that include a set of active state frames and inactive state frames that combined define a duration of the idle state, the method comprising the steps of:

clock means for generating a clock signal that has an output frequency that varies as a function of the active and inactive frames, the clock frequency being higher in the active state and lower in the inactive state, such that the receiver consumes more power during the active state then when in the inactive state;

means for synchronizing the receiver with the transmitted signal during the idle state, synchronizing means coupled to the receiver and the clock signal generator; and means for reducing power consumption of the receiver by dynamically and synchronously switching to a lower clock frequency corresponding to the inactive state and increasing the number of inactive frames within the idle state, power consumption being a function of the power consumed during the active and inactive states and the duration of the idle state.

19. The apparatus of claim 18 wherein power consumption reduction means further including means for synchronizing a frame counter of the receiver with a frame counter of the base unit at the end of the inactive state.

20. The apparatus of claim 19 wherein power consumption reduction means further including means for synchronizing a multiframe counter of the receiver with a multiframe counter of the base unit at the end of the inactive state.

* * * * *